United States Patent [19]
Blind et al.

[11] Patent Number: 5,096,589
[45] Date of Patent: Mar. 17, 1992

[54] HYDROGEN SULFIDE REMOVAL FROM REVERSE OSMOSIS PRODUCT WATER

[76] Inventors: Roger A. Blind, 11520 Chapin La., Captiva, Fla. 33924; Robert E. Hollander, 2039 Sunrise Cir., Sanibel, Fla. 33957

[21] Appl. No.: 635,830
[22] Filed: Dec. 31, 1990
[51] Int. Cl.⁵ .............................................. C02F 1/44
[52] U.S. Cl. .................................. 210/638; 210/652; 210/754; 210/916
[58] Field of Search ............... 210/651, 652, 724, 754, 210/916, 638, 206, 254, 259

[56] References Cited

U.S. PATENT DOCUMENTS

| | | | |
|---|---|---|---|
| 3,505,216 | 4/1970 | Kryzer | 210/652 |
| 3,795,609 | 3/1974 | Hill et al. | 210/638 |
| 4,839,057 | 6/1989 | White | 210/667 |

FOREIGN PATENT DOCUMENTS

| | | | |
|---|---|---|---|
| 50-21564 | 3/1975 | Japan | 210/652 |
| 61-283392 | 12/1986 | Japan | |

OTHER PUBLICATIONS

Waltrip et al., "Elimination of Odor at Six Major Wastewater Treatment Plants", Journal WPCF, vol. 57, No. 10, pp. 1027-1032.
Letter to Dr. Admadi, Department of Environmental Regulation, Lee County, Florida dated Sep. 8, 1989 from Roger A. Blind.

Primary Examiner—Peter Hruskoci
Attorney, Agent, or Firm—Duckworth, Allen, Dyer & Doppelt

[57] ABSTRACT

A method and system for treating water containing hydrogen sulfide. The system includes the demineralizing the water to remove mineral impurities. The demineralized water is then treated with chlorine to convert the hydrogen sulfide in the demineralized water to hydrochloric acid and sulfuric acid while dropping the water's pH level. The water is then neutralized either by using a marble contact bed and/or by the addition of sodium hydroxide. By demineralizing the water prior to adding chlorine, the pH level of the water is lowered when chlorine is added and elemental sulfur is prevented from forming.

9 Claims, 1 Drawing Sheet

COMMERCIAL APPLICATION

PILOT PLANT

COMMERCIAL APPLICATION

HYDROGEN SULFIDE REMOVAL FROM REVERSE OSMOSIS PRODUCT WATER

BACKGROUND OF THE INVENTION

This invention relates to a method and apparatus for purifying reverse osmosis treated water and more particularly to a method for removing hydrogen sulfide ($H_2S$) and subsequently adjusting pH and hardness. Reverse osmosis (RO) water treatment plants are often fed with water which contains hydrogen sulfide ($H_2S$). The $H_2S$ passes through the membranes and into the product water (or permeate), where it must be removed prior to distribution as potable water. The traditional method of accomplishing this degassification is via forced draft degassifiers, sometimes followed by a gas scrubber to clean the gasses prior to release to the atmosphere. This degassification/scrubbing process is not 100% efficient and hydrogen sulfide emissions and resulting odor problems inevitably occur. However, the degassification process also creates a new problem; it saturates the water with oxygen, which leads to subsequent downstream corrosion problems in the copper pipes in the homes of consumers. More specifically, scattered incidences of copper pipes developing holes frequently occur.

Examination of sections of the corroded and failed copper pipes indicates a pitting type of corrosion, as opposed to a grooving type. The pits were distributed over the entire inside walls of the failed pipes. The pits were of varying sizes and depths, with the deepest ones eventually leading to holes and leaks. This type of corrosion is caused by oxygen in the water resulting from the forced draft degassification.

Common methods for removing oxygen from water include the addition of sodium sulfite ($Na_2SO_3$) or hydrazine ($N_2H_4$) to the processed water. Vacuum degassification is another possibility. All these oxygen removal techniques result in either unacceptable water quality or excessively high costs.

Another potential solution to the corrosion problem is to avoid the oxygen addition altogether and remove the $H_2S$ by other means than degassification. Oxidation of the $H_2S$ to other forms is one such possibility. Ozone is one potential oxidizing chemical, but it is too costly.

Another chemical that may be used as an oxidizing agent is chlorine. However, the potential problem with chlorine oxidation of $H_2S$ is that there are two possible chemical paths . . . one of which could cause problems in a potable water system. The two potential paths can be described by the following two chemical equations:

$$H_2S + Cl_2 = 2HCl + S \quad (1)$$

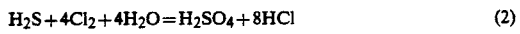

$$H_2S + 4Cl_2 + 4H_2O = H_2SO_4 + 8HCl \quad (2)$$

Equation (1) shows the formation of elemental sulfur, which would create turbidity and foul downstream equipment. If this occurred, removal and disposal of the sulfur would obviously be required, and this would result in very high capital and operating costs. Equation (2) shows all the $H_2S$ oxidized to sulfate ($SO_4$), which remains in solution as a harmless anion.

Historically, the problem has been how to avoid the reaction in Equation (1). This has proven to be very difficult, and chlorine oxidation of $H_2S$ has therefore been largely limited to situations where the elemental sulfur poses no serious problem, as in irrigation systems (where the sulfur is discharged along with the water itself) or in the raw water feed to water treatment plants (where filtration or other methods are then used to remove the elemental sulfur). For chlorine oxidation to be a practical and economic process for eliminating the $H_2S$ in reverse osmosis permeate, a way would have to be found to avoid the reaction in Equation (1) and to force Equation (2) to prevail.

Oxidation of $H_2S$ in the incoming feed water has been tried many times in the utility industry. In all cases, elemental sulfur was formed and either it was removed (by filtration, etc., at considerable expense) or the process was subsequently abandoned. Chlorine is not used to remove $H_2S$ from the feed water to reverse osmosis plants because of the need for extremely low turbidity to avoid membrane fouling.

SUMMARY OF THE INVENTION

An object of this invention is to oxidize the $H_2S$ in the reverse osmosis product water (output) using chlorine.

Another object of this invention is to remove hydrogen sulfide from such water without forming elemental sulfur.

It is also an object of the invention to remove the hydrogen sulfide ($H_2S$) without adding oxygen as a result.

It is another object of the invention to subsequently neutralize the chlorinated water either in a marble (calcium carbonate) bed or by the addition of sodium hydroxide.

These and other objects are accomplished by a method of treating reverse osmosis product water containing hydrogen sulfide, the method comprising the steps of demineralization to remove the mineral impurities, followed by removal of the $H_2S$ and subsequent pH neutralization. It is preferable that the water is demineralized by using a reverse osmosis process. Once the water has been demineralized, the water is treated with chlorine that reacts with the hydrogen sulfide to form both sulfuric acid and hydrochloric acid. The amount of chlorine added is preferably maintained at 8.4 ppm of chlorine for every 1 ppm hydrogen sulfide. When the purified water is treated with chlorine, the pH level preferably drops to a level of about 3. Sulfuric acid and hydrochloric acid are formed, and elemental sulfur formation is avoided. It is preferable that the chlorinated water be then fed through a marble contact bed for neutralization. Further, the marble contact bed will add sufficient hardness to the water to give the water a good taste and further reduce corrosivity. Neutralization with sodium hydroxide is another possibility.

The invention may also be practiced by an apparatus for treating water containing hydrogen sulfide comprising means for demineralizing to remove mineral impurities, removing the hydrogen sulfide, and a means for chlorinating the demineralized water so as to cause the hydrogen sulfide in the demineralized water to form sulfuric acid and hydrochloric acid while dropping the water's pH level. It may also be preferable that the apparatus further include a marble contact bed to which the chlorinated water is fed for neutralization and increasing hardness. Means for adding sodium hydroxide may be included to neutralize the chlorinated water.

DESCRIPTION OF THE PREFERRED EMBODIMENTS

Figure 1:
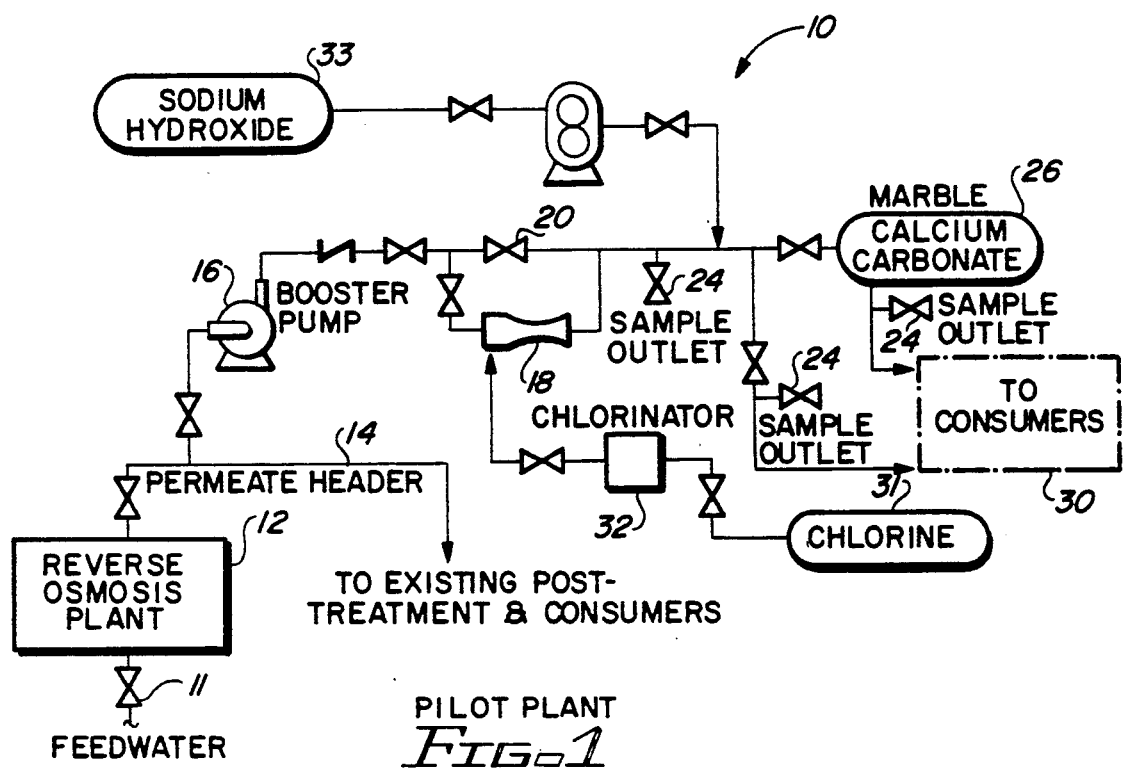
FIG. 1 is a simplified flow diagram showing a pilot plant used to demonstrate the process for hydrogen sulfide removal from reverse osmosis product water, followed by neutralization with sodium hydroxide and/or in a marble contact bed.

The preferred embodiment of the pilot plant practicing the invention is shown in FIG. 1. Plant 10 includes a reverse osmosis plant 12, having a product (permeate) header 14, coupled to a stainless steel centrifugal pump 16. The feed water enters plant 10 at inlet 11. The stainless steel centrifugal pump 16 takes suction from the permeate header 14 before any existing post treatment processes. The pump 16 raises the pressure from around 10 pounds per square inch gage (psig) in the permeate header to around 40 psig, in order to provide the necessary pressure to operate the chlorine injector 18 and to subsequently add chlorine 31, via the chlorinator 32. The amount of chlorine to be added is 8.4 ppm of chlorine for every 1 ppm of hydrogen sulfide. The injector 18 was installed in a branch of the flow from the pump 16 and the remainder of the flow was directed through throttling valve 20 to create the necessary pressure drop across the injector 18 (approximately 30 psig).

Downstream of the injector 18, the two streams rejoin and flow to a marble contact bed 26. The marble bed 26 neutralizes the pH of the water as well as adding hardness to the water. Another method of neutralization utilizing sodium hydroxide 33 was also provided as an alternative to the marble bed 26. The treated water output 30 was sent to waste, but could be sent to the consumer. Sample taps 24 are installed at various locations to check the effectiveness of the process.

When plant 10 was first started up, a number of laboratory tests were run. These results are given in Table 1 below.

TABLE 1

| Test | Raw | Test Results Water Permeate | Chlorinated Permeate |
|---|---|---|---|
| pH | 7.24–7.5 | 6.22–6.6 | 2.85–3.04 |
| Alkalinity (mg/1 CaCO3) | 156–163 | 8–12 | 0 |
| Calcium (mg/1 Ca) | 85–113 | <1 | <1 |
| Sodium (mg/1 Na) | xxx | 20–46 | xxx |
| Free Chlorine (mg/1 Cl) | xxx | xxx | 1.4–1.6 |
| Sulfate (mg/1 SO4) | 345–612 | 0–6.8 | 14.3–20.3 |
| Hydrogen Sulfide (mg/1 H2S) | xxx | 3.1–4.1 | 0 |
| Colloidal Sulfur (mg/1 S) | xxx | xxx | 0 |

The results of these pilot plant observations are summarized as follows:

The 3 to 4 ppm of H2S in the permeate was reduced to zero in the treated water.

The dissolved oxygen level in the chlorinated water was found to be in the range of 0.2 to 0.5 ppm, identical to that in the well water. Therefore, the process was avoiding any increase in oxygen.

Complete H2S removal was ensured by monitoring the chlorine residual in the water. As the chlorine flow was increased, the H2S remaining in the treated water decreased. The moment a chlorine residual of any level was observed, the H2S level was observed to be zero. The chlorine flow was adjusted to oxidize all the H2S and leave a residual of any desired level for disinfection purposes.

No detectable elemental sulfur was present in the treated water. A small stream of the water was filtered through 0.47 micron filters for twenty-four hours on seven consecutive days. With the exception of one day when the chlorine supply was exhausted, no discoloration of the filter elements could be seen, indicating the absence of elemental sulfur.

The sulfate level in the treated water was considerable higher than in the untreated permeate, but still well below allowable limits.

All the above qualitative facts seemed to indicate that only the desirable reaction (above Equation (2)) was taking place.

Next, some quantitative facts were needed to confirm the above qualitative observations. Considering first the chlorine flow rate and returning to Equation (2):

$$H_2S + 4Cl_2 + 4H_2O = H_2SO_4 + 8HCL$$

Looking at the molecular weights in this equation:

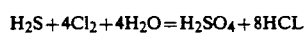

$$34 + 284 + 72 = 98 + 292$$

Therefore, for every pound or ppm of H2S, we should need 284/34, or 8.35 pounds or ppm of chlorine. For a water flow of "X" gpm and an H2S level of "Y" ppm, we should need the following pounds/day of chlorine for oxidation:

"X" gpm $H_2O \times$ "Y" ppm $H_2S \times 8.33$ lb/gal $\times 1,440$
min/day $\times 8.35$ ppm $Cl_2$/ppm $H_2S/10^6$ or:

0.10XY lb/day chlorine for oxidation

To hold a residual chlorine level of 1.5 ppm, with a water flow of "X" gpm, we should need the following pounds/day of chlorine:

"X" gpm $H_2O \times 8.33$ lb/gal $\times 1,440$
min/day $\times 1.5/10^6$ ppm $Cl_2$ or:

0.02 $\times$ lb/day chlorine for residual

Combining the above two equations, we should need the following total amount of chlorine to oxidize "Y" ppm H2S at a water flow of "X" gpm and leave a residual of 1.5 ppm chlorine.

$$\text{Total lb/day } Cl_2 = 0.10XY + 0.02 X \qquad (3)$$

A series of water samples were taken over a period of time and the laboratory results were used to check the above theory. Using a water flow rate of 20 gpm and a H2S level of 4.1 ppm, the chlorine flow using Equation (3) should be:

$$0.10^2(20 \times 4.1) + 0.02(20) = 8.6 \text{ lb/day}$$

In actuality, the chlorine flow meter read a flow of approximately 9 lb/day.

Next, a sulfur balance was performed on the process to prove that all the sulfur in the H2S is converted to sulfur in the form of sulfate. Again, using actual laboratory results with a water flow rate of 20 gpm, when an $H_2S$ level of 4.1 ppm was inserted into the process, the concentration was essentially 0 ppm out. Correspondingly, sulfate levels of essentially 0 ppm in resulted in 14.8 ppm out. Combining this data with the above molecular weight data, the sulfur (in lb/day) into the process in the form of $H_2S$ was as follows:

20 gpm $H_2O \times 8.33$ lb/gal $\times 1,440$ min/day $\times 4.1$ ppm $H_2S/10^6 \times 32/34$ lb sulfur/lb $H_2S = 0.93$ lb sulfur/day in The sulfur (in lb/day) out of the process in the form of sulfate ($SO_4$) was as follows:

20 gpm $H_2O \times 8.33$ lb/gal 33 1,440 min/day $\times 14.8$ ppm $SO_4/10^6 \times 32/96$ lb sulfur/lb $SO_4 = 1.18$ lb sulfur/day out Since the sulfur in approximates the sulfur out, this again represents reasonable agreement, considering all the potential sources of experimental error. Since the sulfur out was a little more than the in, there is little chance that there was undetected elemental or other forms of sulfur created, confirming the reaction according to Equation (2).

From the pilot plant data, it was determined that the process succeeds largely as a result of the purity of the reverse osmosis permeate before the chlorine is added. Since there are few impurities to interfere with the reaction and little alkalinity to buffer the reaction, the pH of the water drops very rapidly to around 2.9 to 3.0 when the chlorine is added. In fact, using the sample taps 24 in the pilot plant 10 mentioned above, it was found that the reaction was completed only five feet downstream of the chlorine injection point. This rapid drop in pH assures that the reaction proceeds as desired, according to Equation (2) and no elemental sulfur is formed.

Six sets of data would be taken on four different days. Samples were taken on two different days for each of two different reverse osmosis membrane types (high pressure and low pressure). The tests were ran over the period of a month's time with six samples during the period. The results of the tests were listed in the above Table 1. The data are internally consistent and confirm the theory discussed above, to the extent possible with normal experimental errors.

As mentioned above, when the chlorine is added to the water in an amount necessary to ensure complete oxidation of the $H_2S$, the pH of the water falls to around 3.0. Neutralization is required and sodium hydroxide 33 (NaOH), would be the normal chemical of choice. However, the addition of more sodium to the water may present a potential problem, since reverse osmosis product water often already contains considerable sodium. Neutralization with sodium hydroxide 33 was tested in the pilot plant 10 and found to proceed in accordance with well known chemical theory.

Since sodium levels in water treated as described above could be potentially too high, another method of neutralization was also tested in pilot plant 10. The chlorinated (pH 3) water was treated in a marble (calcium carbonate) contact bed 26. One such bed 26 is manufactured by Hungerford & Terry, Inc. of Clayton, N.J. The results are summarized in Table 2.

TABLE 2

|  | Water to Bed | Water From Bed |
|---|---|---|
| pH | 2.9 | 7.5 |
| Calcium (as $CaCO_3$, ppm) | 2.5 | 140 |

The pH of 7.5 in the water from the marble bed 26 (see Table 2) is nearly perfect for distribution to consumers as potable water. The increase in calcium level (see Table 2) represents an increase in hardness that results in a better tasting and less corrosive water. Calcium levels between 2.5 and 140 ppm can easily be produced by blending various portions of waters neutralized with marble bed 26 and with sodium hydroxide 33.

This ends the description of the preferred pilot plant embodiment.

Figure 2:
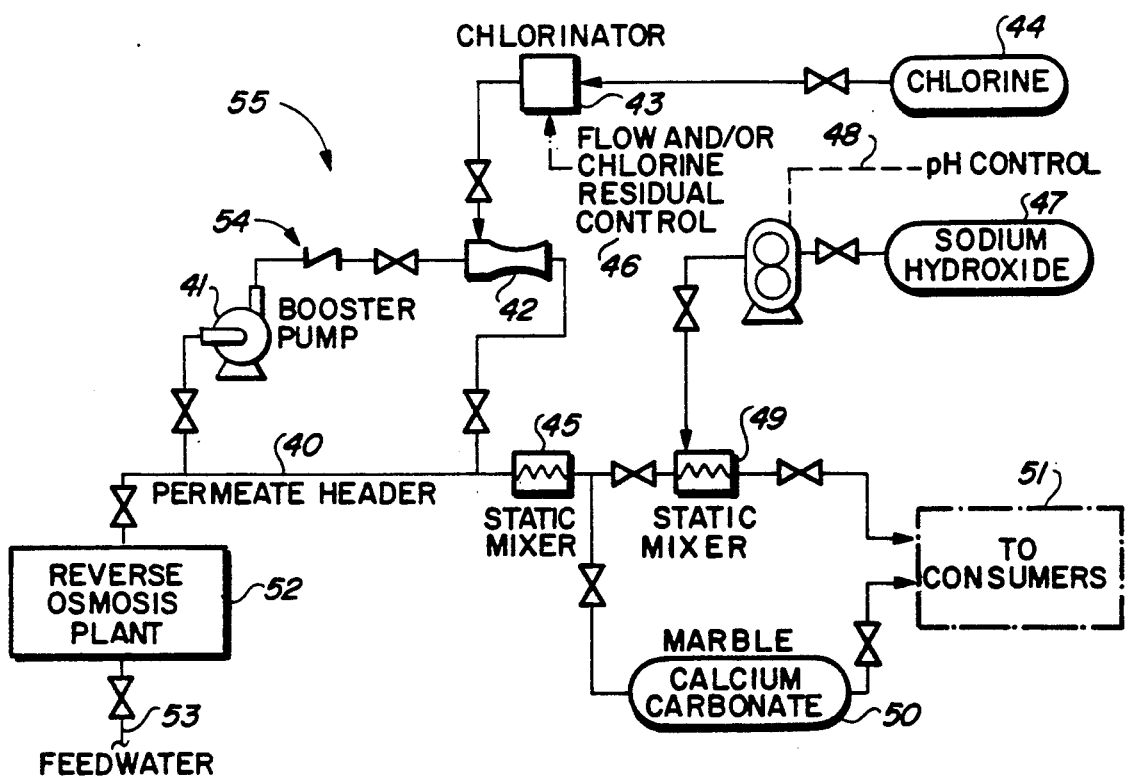
FIG. 2 is a simplified flow diagram of one possible commercial application of the hydrogen sulfide removal and neutralization process with automatic chlorine addition and pH control via sodium hydroxide, and/or marble contact bed.

FIG. 2 depicts one preferred commercial application embodiment. In this application, the chemistry is identical to that described above for the pilot plant embodiment, but the preferred employed equipment is different.

In the commercial application plant 55, feed water 53 enters the reverse osmosis plant 52 and product (permeate) leaves the reverse osmosis plant 52 via the permeate header 40. Although a reverse osmosis plant 52 is disclosed, other demineralization water treatment processes, such as deionization may be substituted for the reverse osmosis plant 52. A small side stream of permeateflows through a chlorine addition loop 54, comprised of a booster pump 41, chlorine injector 42, chlorinator 43 and chlorine containers 44. Chlorine addition rate may be manually or automatically controlled by water flow and/or chlorine residual level 46. The chlorinated stream re-enters the permeate header 40 and passes through a static mixer 45 to ensure complete mixing before neutralization.

After static mixer 45, the chlorinated water may be neutralized by either the addition of sodium hydroxide 47 on pH control 48 and a second static mixer 49 or by passing through a marble contact bed 50. Both neutralization methods may be used together or separately, with the neutralized waters blended to give water of the desired quality for distribution to consumers 51.

This concludes the description of the preferred embodiments. A reading by those skilled in the art will bring to mind various changes without departing from the spirit and scope of the invention. It is intended, however, that the invention only be limited by the following appended claims.

What is claimed is:

1. A method of treating water containing hydrogen sulfide comprising the steps of:
    demineralizing the water using reverse osmosis to remove mineral impurities; and
    chlorinating the demineralized water to convert the hydrogen sulfide into sulfuric acid and hydrochloric acid while dropping the pH level to about 3 and preventing the formation of elemental sulfur.

2. The method of treating water containing hydrogen sulfide as recited in claim 1 further comprising the step of feeding the chlorinated water through a marble contact bed to neutralize the chlorinated water.

3. The method of treating water as recited in claim 2 further comprising the steps of:
    adding sodium hydroxide to a portion of the chlorinated water to neutralize the water; and blending the sodium hydroxide neutralized water with water from the marble bed to optimize the water quality and produce potable water.

4. The method of treating water containing hydrogen sulfide as recited in claim 1 further comprising the step of adding sodium hydroxide to neutralize the chlorinated water.

5. The method of treating water as recited in claim 1 further comprising the step of adding chlorine in amounts of 8.4 ppm chlorine for every 1 ppm of hydrogen sulfide.

6. A method for treating water containing hydrogen sulfide comprising the steps of:
   removing mineral impurities from the water using reverse osmosis; and
   chlorinating the demineralized water to precipitate the reaction:

$$H_2S + 4Cl_2 + 4H_2O = H_2SO_4 + 8HCl$$

while dropping the pH level to about 2.9 to 3.0 without forming elemental sulfur.

7. The method as recited in claim 6 further comprising the steps of:
   neutralizing the chlorinated water with a marble contact bed; and
   feeding the chlorinated water through the marble contact bed to produce potable water.

8. The method as recited in claim 6 further comprising the step of adding sodium hydroxide to the chlorinated water to produce potable water.

9. A method for treating water containing hydrogen sulfide comprising the steps of:
   removing mineral impurities from the water using reverse osmosis;
   chlorinating the demineralized water to precipitate the reaction:

$$H_2S + 4Cl_2 + rH_2O = H_2SO_4 + 8HCl;$$

and
   adding chlorine to the demineralized water in the amount of 8.4 ppm of chlorine for every 1 ppm of hydrogen sulfide to prevent formation of elemental sulfur.

* * * * *